(12) United States Patent
Huynh Tuong et al.

(10) Patent No.: US 8,297,025 B2
(45) Date of Patent: Oct. 30, 2012

(54) METHOD OF BUILDING A HYBRID TOWER FOR A WIND GENERATOR

(75) Inventors: Alain Huynh Tuong, Montrouge (FR); Benoit Melen, Bois Colombes (FR)

(73) Assignee: Soletanche Freyssinet, Rueil Malmaison (FR)

( * ) Notice: Subject to any disclaimer, the term of this patent is extended or adjusted under 35 U.S.C. 154(b) by 24 days.

(21) Appl. No.: 13/079,309

(22) Filed: Apr. 4, 2011

(65) Prior Publication Data

US 2011/0239584 A1     Oct. 6, 2011

(30) Foreign Application Priority Data

Apr. 6, 2010  (EP) .................................... 10305351

(51) Int. Cl.
*E04B 1/00* (2006.01)

(52) U.S. Cl. ............................ 52/745.17; 52/40; 52/848

(58) Field of Classification Search ............... 52/745.02, 52/745.03, 745.04, 745.17, 745.18, 745.19, 52/745.2, 121, 122.1, 125.1, 126.1, 123.1, 52/111, 648.1, 651.01, 651.02, 651.07, 848, 52/40, 29, 651.03; 29/889; 290/43, 54, 55; 414/9, 142, 146 R, 244 A, 244 R, 246, DIG. 6
See application file for complete search history.

(56) References Cited

U.S. PATENT DOCUMENTS

| | | | |
|---|---|---|---|
| 5,490,364 A * | 2/1996 | Desai et al. ..................... 52/637 |
| 6,782,667 B2 * | 8/2004 | Henderson ...................... 52/116 |
| 7,114,295 B2 | 10/2006 | Wobben | |
| 7,966,777 B2 * | 6/2011 | Douglas et al. ................. 52/118 |
| 8,056,296 B2 * | 11/2011 | Cairo .......................... 52/651.01 |
| 8,069,634 B2 * | 12/2011 | Livingston et al. ........ 52/745.17 |
| 2008/0209842 A1 | 9/2008 | Montaner Fraguet et al. | |
| 2009/0087311 A1 * | 4/2009 | Wyborn ............................ 416/9 |
| 2010/0189531 A1 * | 7/2010 | Christensen .................... 414/10 |

FOREIGN PATENT DOCUMENTS

| | | |
|---|---|---|
| CA | 2567859 | 2/2008 |
| DE | 3718436 | 12/1988 |
| DE | 10111280 | 7/2002 |
| DE | 102008055607 | 5/2009 |
| EP | 1156175 | 11/2001 |
| EP | 1262614 | 12/2002 |
| EP | 1474579 | 11/2004 |

(Continued)

*Primary Examiner* — Brian Glessner
*Assistant Examiner* — Beth Stephan
(74) *Attorney, Agent, or Firm* — McKenna Long & Aldridge

(57) ABSTRACT

In the method of building a hybrid tower, a metal mast is erected and connected to a foundation and a concrete structure having a plurality of superimposed concrete segments is built around the metal mast by using the metal mast as a support. Afterwards, the metal mast is disconnected from the foundation and lifted by telescoping and guiding the metal mast along concrete structure. Finally, the lifted metal mast is connected to the concrete structure. Building of the concrete structure comprises: (a) installing at least one first segment of the concrete structure; (b) lifting the installed segment(s) of the concrete structure along the metal mast by guiding the lifted segments of the concrete structure using the metal mast, so as to clear a space having a sufficient height to receive a next segment of the concrete structure; (c) installing the next segment of the concrete structure in said space; and (d) repeating steps (b) and (c) until a last segment of the concrete structure is installed at a bottom part of the concrete structure.

6 Claims, 4 Drawing Sheets

FOREIGN PATENT DOCUMENTS

| | | |
|---|---|---|
| EP | 2009202 | 12/2008 |
| EP | 2082131 | 7/2009 |
| JP | 01190883 | 7/1989 |
| JP | 2002122066 | 4/2002 |
| JP | 2003239567 | 8/2003 |
| JP | 2006022675 | 1/2006 |
| WO | WO 02/04766 | 1/2002 |
| WO | WO 02/46552 | 6/2002 |
| WO | WO 2007/125138 | 11/2007 |
| WO | WO 2009/056898 | 5/2009 |
| WO | WO 2009/056969 | 5/2009 |

* cited by examiner

METHOD OF BUILDING A HYBRID TOWER FOR A WIND GENERATOR

This application claims priority to European Patent Application No. 10 305351.8 filed on Apr. 6, 2010, which is hereby incorporated by reference in its entirety.

BACKGROUND OF THE INVENTION

The present invention relates to the construction of hybrid towers having a lower part made of concrete and an upper part made of metal.

Typically, such a tower is used to support the nacelle of an in-shore wind generator of large power (e.g. 3 MWatt or more) high above ground level (e.g. about 140 m).

When the height of a wind generator tower increases, the cost of conventional cylindrical steel masts becomes excessive. To circumvent the technological limitation of cylindrical metallic masts, some manufacturers have developed towers made of steel trellis (or truss). However, such towers have poor esthetics.

Other manufacturers make the tower with concrete cast in-place on at least part of the height of the tower, using climbing or sliding formwork. This kind of construction method is sensitive to temperature conditions which can be experienced on the site, slowing or preventing setting of the concrete, and also to wind conditions since the concrete armatures must be mounted with a tall crane. Such a construction method becomes very expensive for very high towers.

Some wind generator towers are made of prefabricated concrete elements over their whole height. The elements are lifted using a tall crane. They can be assembled into annular segments on the ground, the crane being powerful enough to raise a whole segment, or directly in their high position. A drawback of such technique is its sensitivity to wind and the associated regulatory constraints, causing a strong impact on construction delays. Another limitation is the availability of cranes of sufficient power and height, which must be reserved months in advance.

Some telescoping techniques have also been proposed to build wind power plants. For example, DE10111280 discloses a wind power plant having mast segments raised up by a lift device in order to insert new segments from below. JP 1 190883 discloses a method of lifting an iron tower on top of a high building using jacks and a balance weight secured to the bottom of the iron tower. Another lifting device for the assembly of a wind turbine is disclosed in WO 2007/125138 A1.

The concept of a hybrid tower, made of concrete on part of the height (e.g. 50 m or more) and an metal mast on top of it, makes it possible to take advantage of an industrial concrete process and to avoid the requirement, for the civil engineering contractor, to handle heavy loads using high capacity cranes. Such a technology is compatible with the organization of wind generator providers having their own special cranes to install their nacelles. However, such a technology has hardly been implemented in practice.

There is a need to further develop the hybrid tower concept to make it more practicable.

It is proposed a method of building a hybrid tower, comprising:
- erecting a metal mast connected to a foundation;
- building a concrete structure having a plurality of superimposed concrete segments around the metal mast by using the metal mast as a support;
- disconnecting the metal mast from the foundation;
- lifting the metal mast by telescoping and guiding the metal mast along the concrete structure; and
- connecting the lifted metal mast to the concrete structure.

The step of building of the concrete structure comprises:
a) installing at least one first segment of the concrete structure;
b) lifting the installed segment(s) of the concrete structure along the metal mast by guiding the lifted segments of the concrete structure along the metal mast using suitable bearing devices, so as to clear a space having a sufficient height to receive a next segment of the concrete structure;
c) installing the next segment of the concrete structure in said space; and
d) repeating steps b) and c) until a last segment of the concrete structure is installed at a bottom part of the concrete structure.

The metal mast is used as a guiding support when building the concrete structure, and afterwards the concrete structure is used as a support to raise the metal mast. The method is well suited to the industrial installation of large windmill farms, with many steps carried out at ground level where environmental conditions are better handled or controlled.

The concrete structure is typically built by assembling prefabricated elements, although in situ casting methods may also be used for at least part of the height of the concrete structure.

In an embodiment, a guiding structure is connected to a bottom portion of the metal mast, the guiding structure having a lower portion provided with a guide part for cooperating with the concrete structure when the metal mast is lifted. The guiding structure can be removably connected to the bottom portion of the metal mast, and disconnected after the step of lifting the metal mast so as to be reusable for building another tower.

The guiding structure can be placed between the metal mast and the foundation in the step of erecting the metal mast, and used as a lifting support structure in the step of building the concrete structure.

Other features and advantages of the method and tower disclosed herein will become apparent from the following description of non-limiting embodiments, with reference to the appended drawings.

BRIEF DESCRIPTION THE DRAWINGS

DESCRIPTION OF PREFERRED EMBODIMENTS

Figure 1:
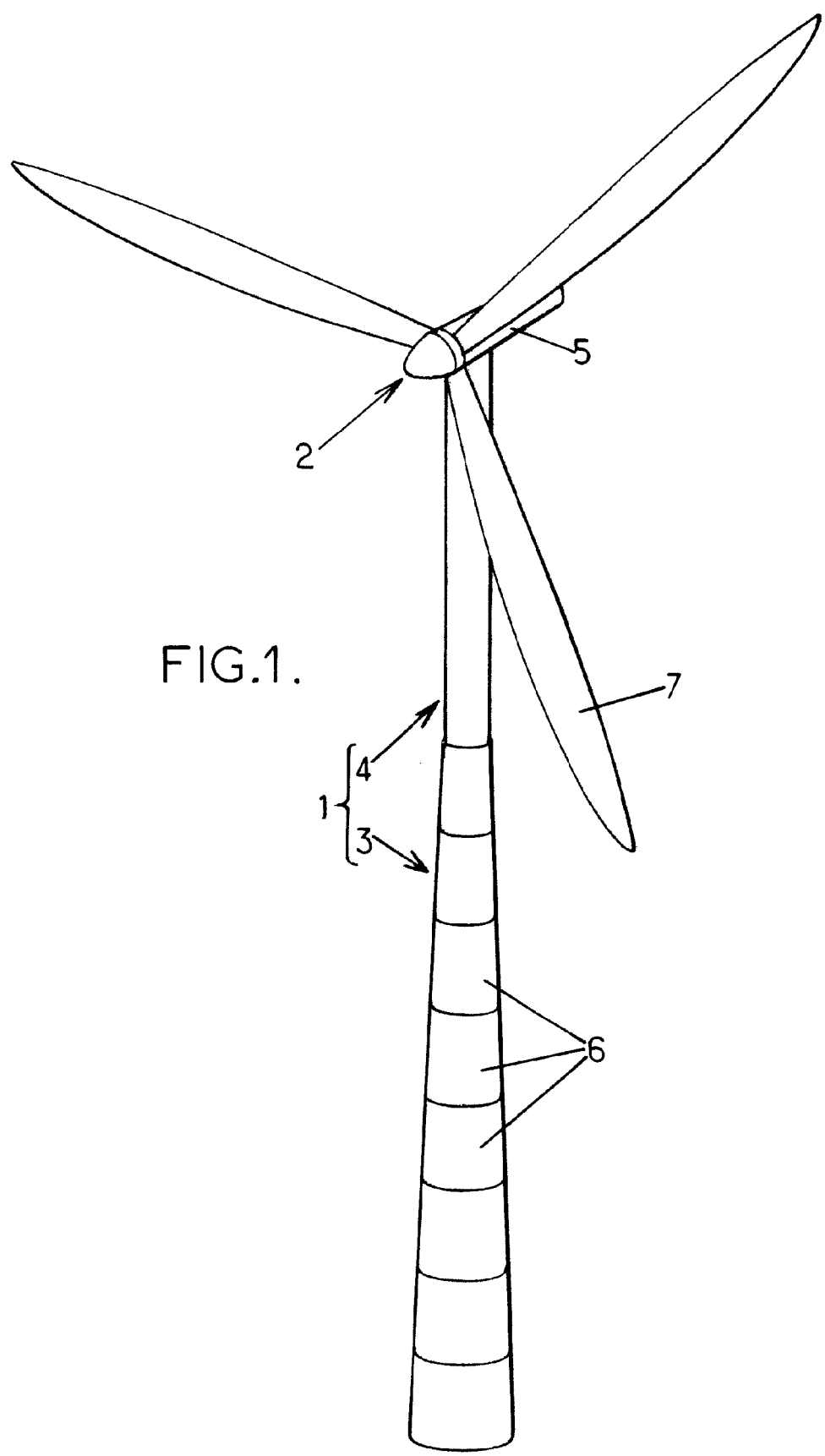
FIG. 1 is a schematic perspective view of a wind machine installed on top of a hybrid tower.

As shown in FIG. 1, a hybrid tower 1 for a wind generator 2 has a concrete structure 3 in the lower part and a metal mast 4 in the upper part. The nacelle 5 for the generator 2 is mounted on top of the metal mast 4. The mast 4 can be made of one or more cylindrical steel sections assembled by bolting or welding.

In the illustrated embodiment, the concrete structure 3 includes superimposed segments 6 assembled on site from prefabricated concrete elements. The concrete structure 3 has a generally conical shape which may be formed with a constant angle over its height. It is also possible to have a cylindrical concrete section above the conical shape if it is desired to have a constant distance between the tower wall and the rotating blades 7 of the wind generator 2. In the example depicted in FIG. 1, the conical shape has a circular base. It will be appreciated that various other shapes can be used, for example pyramidal shapes with a constant angle, making it possible to minimize the number of formwork elements to mould the concrete elements.

To build the hybrid tower, a foundation (not shown in FIG. 1) is first installed on the ground. It can be a deep foundation with bars extending deep into the ground, or a superficial foundation having sufficient inertia and horizontal extension to stabilize the tower. Then the steel mast 4 is erected and connected firmly to the foundation at its base in order to be used as a support structure when building the concrete structure 3. When the concrete structure is completed, the metal mast is disconnected from the foundation and lifted by telescoping and guiding along concrete structure. At the end of the lifting stroke, the steel mast 4 is connected to the upper part of the concrete structure 3.

The structure 3 can be build by lifting prefabricated concrete elements using a crane or a winch mounted on top of the mast 4 and bonding them to the structure being built. The central mast 4 is used a support for lifting and/or positioning the elements which is particularly helpful when the wind is blowing.

In another embodiment, of which an example is illustrated in FIGS. 2-5, the concrete structure 3 is built by assembling segments from top to bottom, from underneath. Each segment 6 can be made by assembling concrete elements at ground level and bonding them along vertical joints. The making of the concrete segments at ground level is advantageous since it is relatively easy to control environmental conditions, if necessary by providing an enclosure to protect the working area from wind and to ensure a suitable temperature.

Figure 2:
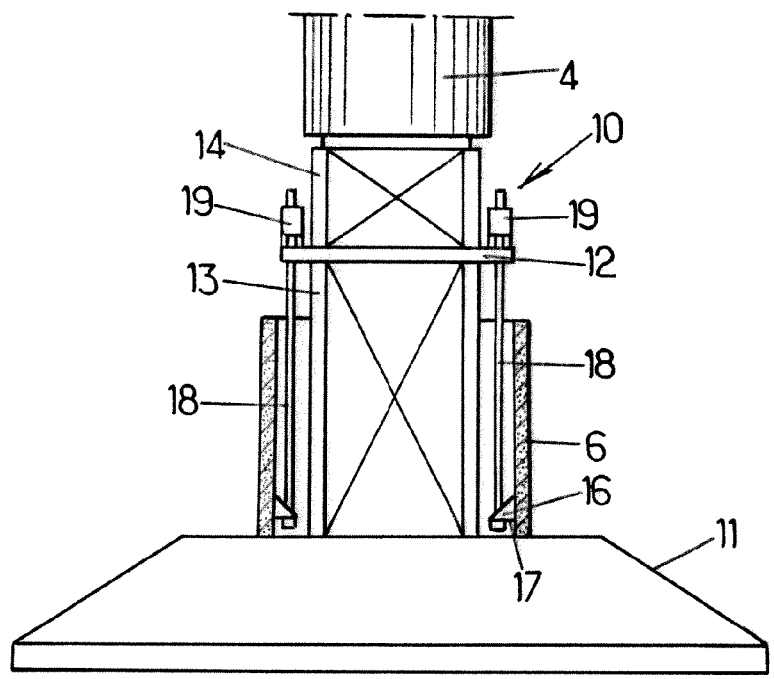
FIGS. 2-6 are diagrams illustrating different steps of the construction of the hybrid tower in an embodiment of the invention.

As shown in FIG. 2, a support structure 10 is placed between the metal mast and the foundation 11 when the metal mast is erected. In the illustrated example, the support structure 10 has a horizontal platform 12 for mounting jacks used in the lifting steps, a lower frame 13 between the foundation 11 and the platform 12 and an upper frame 14 between the platform 12 and the bottom part of the mast 4. The frames 13, 14 are for example made of steel trellis (or truss)

FIG. 2 shows the first segment 6 of the concrete structure 3 which, when the construction is finished, will be located at the top of the concrete structure 3. This segment 6 can be made by assembling several prefabricated concrete elements put into place using guide rails laid on the ground, or by casting concrete in a formwork arranged above the foundation 11 around the lower frame 13 of the support structure 10. Once the first segment 6 is completed, brackets 16 are fixed to its inner face near the bottom part of the segment. Each bracket 16 has a horizontal abutment surface 17 for receiving the lower end of a hoisting cable 18. A number of brackets 16 (for example eight) are distributed along the circumference of the segment 6. Each hoisting cable 18, whose lower end bears against the abutment surface 17 of a bracket 16, extends beyond the platform 12 of the support structure 10 where it is held by a jack 19.

Figure 3:
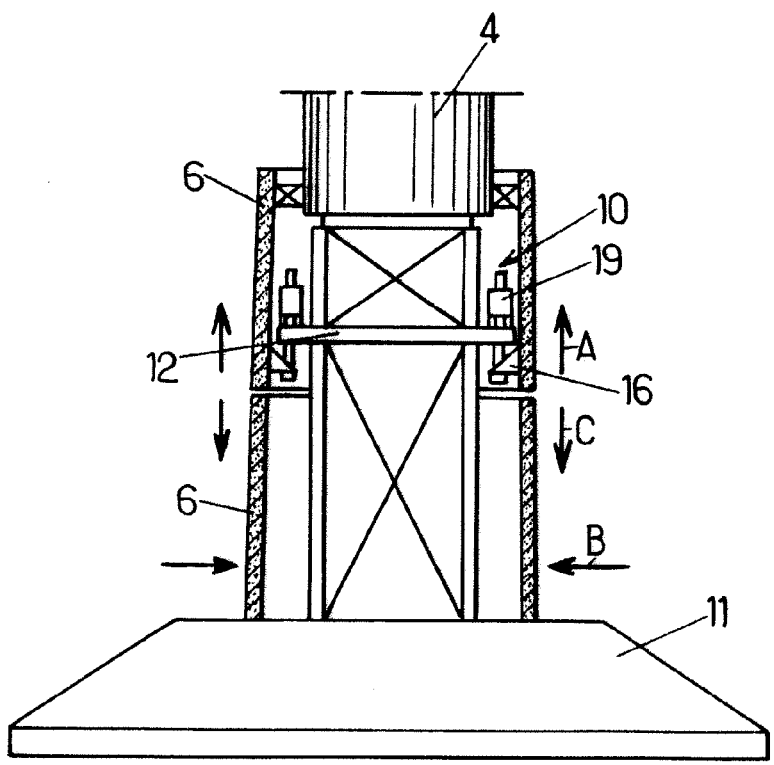

From the position shown in FIG. 2, the jacks 19 are energized to pull up the hoisting cables 18, thus lifting the segment 6 which was just built. The segment 6 is moved to the position shown in the upper part of FIG. 3 as indicated by the arrows A. FIG. 3 also shows guide members 20 positioned between the inner face of the first segment 6 and the outer face of the cylindrical steel mast 4. These guide members 20 are fixed to the segment 6 and their innermost end may have a roller to bear against the mast 4. Several guide members 20 are distributed along the circumference of the segment 6 to guide and stabilize the concrete structure 3 while it is built. They can be fixed to the inside of the segment 6 by an operator standing on the platform 12 once the segment 6 has been sufficiently raised. Alternatively, their angular positions are offset with respect to those of the jacks 19 and they are fixed when the segment 6 is in the lower position shown in FIG. 2.

With the first segment 6 in the lifted position shown in FIG. 3, the next segment 6 can be assembled below it, for example by bringing concrete elements as indicated by the arrows B and bonding them together. When this next segment 6 is ready, the jacks 19 are progressively released to smoothly lay the previous segment 6 on its top surface as indicated by the arrows C. An adhesive can be placed at the interface between the two adjacent segments 6 in order to bond them if necessary.

At this point, the jacks 19 are controlled to lower the hoisting cables 18, brackets 16 are fixed to the inner face of the segment 6 which was just assembled (possibly after having been dismantled from the previous segment), and the lower end of the hoisting cables 18 are respectively applied against the abutment surfaces 17 of the brackets 16. Then the jacks 19 are energized again to lift the two assembled segments 6 as indicated by the arrows D in FIG. 4. During this lifting operation, the concrete structure 3 is suitably guided along the mast 4 by means of the guide members 20.

Figure 4:
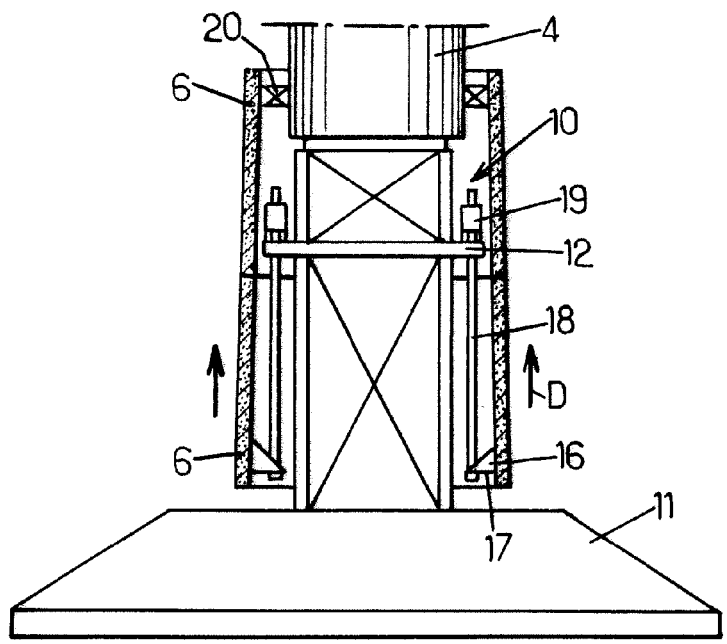

The sequence of operations of FIGS. 3-4 is then repeated a number of times until all the segments 6 of the concrete structure 3 have been installed. Optionally, additional guide members such as 20 can be installed on one or more of the segments 6 to further improve stability of the concrete structure 3.

After the last segment 6 (the one at the bottom of the tower) is in place, prestressing cables can be mounted to strengthen the concrete structure 3, for example using the process described in the European patent application No. EP 09306323.8 filed on Dec. 23, 2009.

The steel mast is then lifted. Again, this lifting can be performed using the platform 12 of the support structure 10 and cable jacks. It is performed after disconnecting the lower frame 13 of the support structure 10 from the foundation 11.

Figure 5:
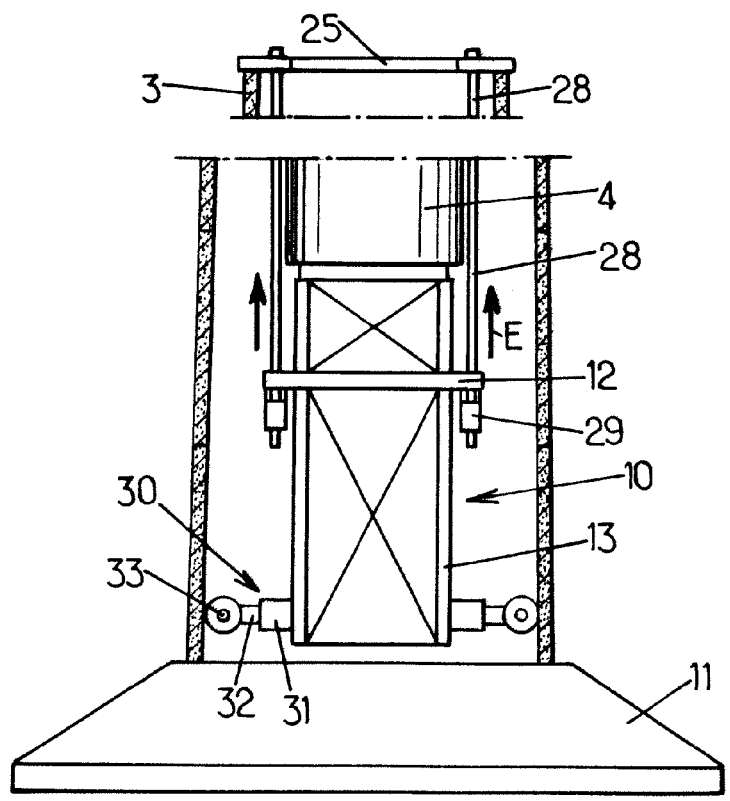

In the embodiment illustrated by FIG. 5, a ring-shaped plate 25 is placed at the top of the concrete structure 3. The plate 25 has a central hole to leave a passage for the steel mast 4 when it is lifted and openings regularly distributed along its periphery, but inside the wall of the concrete structure, to hold the upper ends of long hoisting cables 28 (about as long as the concrete structure is high). The lower ends of the long hoisting cables 28 are connected to respective jacks 29 bearing against the lower face of the platform 12. The jacks 29 are energized to raise the platform 12 and the elements secured to it, including the frames 13, 14 of the support structure 10 and the steel mast 4, as indicated by the arrows E in FIG. 5.

During the lifting of the steel mast 4, the concrete structure 3 which has been previously built and, if needed, prestressed is used as a support to guide and stabilize the mast 4. The guide members 20 located near the upper end of the concrete structure 3 (FIGS. 2-3) can again participate in the guiding of the concrete structure 3 along the steel mast 4, as well as any additional guide members which may have been attached to the inner face of the concrete segments 6 during their erection.

Regarding this guiding function of the concrete structure 3, the critical phase is clearly the final phase in which the mast 4 reaches its final position above the concrete structure 3. The efficiency of the guiding is proportional to the vertical distance between the uppermost and lowermost bearing points, and that distance is minimal during the final phase in which, furthermore, the effects of the wind are maximum.

In order to enhance the guiding function, the above-mentioned vertical distance is increased by using additional guide members 30 attached to the lower portion of the lower frame 13 of the support structure 10. Such guide members 30 are distributed around the periphery of the lower frame 13 in a star arrangement. Each of them has a fixed arm 31 attached to the lower frame 13, a movable arm 32 which can slide radially at the end of the fixed arm 31 remote from the lower frame 13, a roller 33 pivotally mounted about a horizontal axis at the end of the movable arm 32 and an actuator (not shown) to control the radial extension of the movable arm 32.

The guide members 30 are fixed to the support structure 10 before activating the jacks 29 to lift the mast 4. At that time, the movable arms 32 are extended outwardly to be applied against the inner wall of the concrete structure 3. When the mast is raised, the position of the movable arms 32 is adjusted by means of the actuators to retract them progressively as the cross-section of the concrete structure 3 in front of the guide members 30 is reduced.

The nacelle 5 of the wind generator 2 can be installed on top of the mast 4 after the telescoping operation. Alternatively, it is installed before extending the mast or once it has been extended partially. In this case, it is preferable if the center of gravity of the nacelle is aligned on or close to the central axis of the tower.

Figure 6:
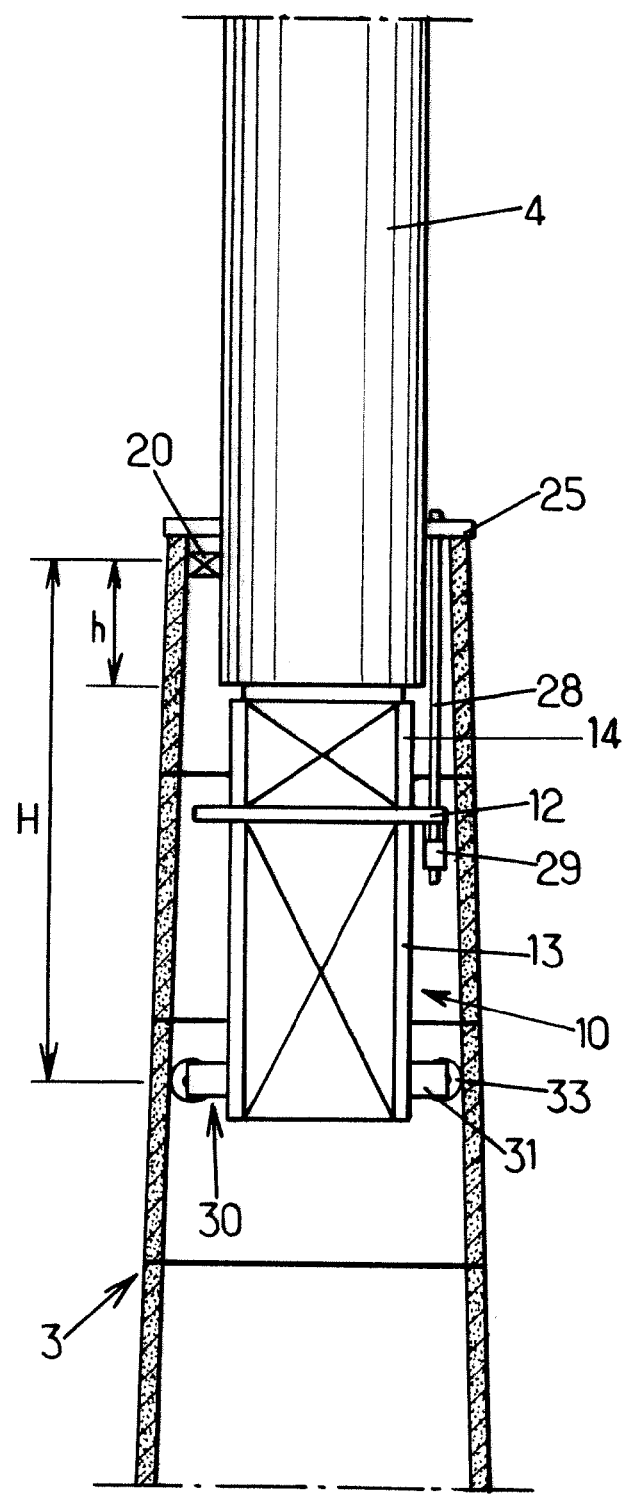

FIG. 6 illustrates the position of the mast 4 and the support structure 10 at the end of the lifting operation. The left-hand part of the figure shows an angular position at which there is a guide member 20 while the right-hand part shows an angular position at which there is a hoisting cable 28 and the associated jack 29. It is seen that the vertical distance H between the guide members 20 near the top of the concrete structure 3 and the guide members 30 at the bottom of the support structure 10 is significant, much larger than that h between the guide members 20 and the bottom part of the mast. The structure 10 is thus designed as a guiding structure which contributes to stabilizing the mast 4 before its final connection to the concrete structure 3. Advantageously, this guiding structure 10 is also used as a lifting support structure in the step of building the concrete structure 3 as discussed with reference to FIGS. 2-4.

Arrangements of the guiding/support structure 10 other than that illustrated in FIGS. 2-6 can be considered. In one such arrangement, the structure 10 has a second, movable platform connected to the fixed platform 12 by the hoisting cables 18 and capable of sliding along vertical rails. The movable platform is applied against the bottom part of the segments 6 to lift them from underneath when assembling the concrete structure 3. Its lateral edges are fitted with the guide members 30 to be used in the step of lifting the steel mast 4.

Various means can be used, alone or in combination, to connect the mast 4 to the concrete structure 3. For example, steel beams can inserted horizontally in the region where the lower part of the mast 4 to the upper part of the concrete structure 3 overlap. It is also possible to provide first armatures on the steel mast 4, projecting outwardly at the lower part of the metal mast, and second armatures on the concrete structure 3, projecting inwardly from the uppermost segment 6, and to connect the lifted metal mast to the concrete structure by pouring cement or mortar in the interval where the first and second armatures extend and overlap.

Afterwards, once the mast 4 is connected to the concrete structure 3, the guiding structure 10 can be disconnected from the bottom portion of the metal mast 4, and brought down to the foundation level using the cables 28 and the jacks 29. The guiding/support structure 10 can then be dismantled and taken out of the tower to be reused in the construction of another similar tower.

It will be appreciated that the embodiment described above is an illustration of the invention disclosed herein and that various modifications can be made without departing from the scope as defined in the appended claims. For example, it is possible to assemble a number of elements of the concrete structure using a crane prior to installing further elements with a method as described with reference to FIGS. 2-4.

The invention claimed is:

1. A method of building a hybrid tower, comprising:
    erecting a metal mast connected to a foundation;
    building a concrete structure having a plurality of superimposed concrete segments around the metal mast by using the metal mast as a support;
    disconnecting the metal mast from the foundation;
    lifting the metal mast by telescoping and guiding the metal mast along the concrete structure; and
    connecting the lifted metal mast to the concrete structure,
    wherein building of the concrete structure comprises:
    a) installing at least one first segment of the concrete structure;
    b) lifting the installed segment(s) of the concrete structure along the metal mast by guiding the lifted segments of the concrete structure using the metal mast, so as to clear a space having a sufficient height to receive a next segment of the concrete structure;
    c) installing the next segment of the concrete structure in said space; and
    d) repeating steps b) and c) until a last segment of the concrete structure is installed at a bottom part of the concrete structure.

2. The method as claimed in claim 1, wherein the concrete structure is built by assembling prefabricated elements.

3. The method as claimed in claim 1, further comprising mounting a wind generator nacelle to an upper part of the metal mast.

4. The method as claimed in claim 1, wherein a guiding structure is connected to a bottom portion of the metal mast, and wherein the guiding structure has a lower portion provided with a guide part for cooperating with the concrete structure when the metal mast is lifted.

5. The method as claimed in claim 4, wherein the guiding structure is disconnected from the bottom portion of the metal mast after the step of lifting the metal mast.

6. The method as claimed in claim 4, wherein the guiding structure is placed between the metal mast and the foundation in the step of erecting the metal mast, and wherein the guiding structure is used as a lifting support structure in the step of building the concrete structure.

* * * * *